US009688449B2

(12) United States Patent
Kaminaga et al.

(10) Patent No.: US 9,688,449 B2
(45) Date of Patent: Jun. 27, 2017

(54) GAS BARRIER FILM

(71) Applicant: TOPPAN PRINTING CO., LTD., Taito-ku (JP)

(72) Inventors: Junichi Kaminaga, Taito-ku (JP); Harumi Matsumoto, Taito-ku (JP); Sayaka Hoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 12 days.

(21) Appl. No.: 14/469,835

(22) Filed: Aug. 27, 2014

(65) Prior Publication Data

US 2014/0363661 A1    Dec. 11, 2014

Related U.S. Application Data

(63) Continuation of application No. PCT/JP2013/055221, filed on Feb. 27, 2013.

(30) Foreign Application Priority Data

Feb. 28, 2012 (JP) ................................. 2012-041252

(51) Int. Cl.
| | |
|---|---|
| B65D 65/40 | (2006.01) |
| B32B 27/32 | (2006.01) |
| B32B 27/08 | (2006.01) |
| B32B 27/30 | (2006.01) |
| B32B 27/36 | (2006.01) |
| C08J 7/04 | (2006.01) |

(52) U.S. Cl.
CPC .............. *B65D 65/40* (2013.01); *B32B 27/08* (2013.01); *B32B 27/308* (2013.01); *B32B 27/32* (2013.01); *B32B 27/36* (2013.01); *C08J 7/047* (2013.01); *B32B 2255/10* (2013.01); *B32B 2255/20* (2013.01); *B32B 2255/26* (2013.01); *B32B 2255/28* (2013.01); *B32B 2307/31* (2013.01); *B32B 2307/7166* (2013.01); *B32B 2307/7242* (2013.01); *B32B 2439/70* (2013.01); *B32B 2439/80* (2013.01); *C08J 2323/12* (2013.01); *C08J 2400/14* (2013.01); *C08J 2429/04* (2013.01); *C08J 2475/04* (2013.01); *Y10T 428/251* (2015.01); *Y10T 428/2826* (2015.01); *Y10T 428/31551* (2015.04)

(58) Field of Classification Search
CPC ............ B32B 2255/10; B32B 2255/20; B32B 2255/26; B32B 2255/28; B32B 2307/31; B32B 2307/7166; B32B 2307/7242; B32B 2439/70; B32B 2439/80; B32B 27/08; B32B 27/308; B32B 27/32; B32B 27/36; Y10T 428/251; Y10T 428/2826; Y10T 428/31551; B65D 65/40; C08J 2323/12; C08J 2400/14; C08J 2429/04; C08J 2475/04; C08J 7/047

USPC ......... 428/324, 349, 354, 423.1, 423.7, 454, 428/500
IPC ...................................................... B65D 65/40
See application file for complete search history.

(56) References Cited

U.S. PATENT DOCUMENTS

| | | | | |
|---|---|---|---|---|
| 5,844,032 | A  * | 12/1998 | Serrano et al. ................ | 524/445 |
| 5,981,029 | A  * | 11/1999 | Harada ..................... | C08J 7/047 |
| | | | | 428/143 |
| 6,569,533 | B1 * | 5/2003 | Uchida et al. ............. | 428/423.1 |
| 2002/0135728 | A1 * | 9/2002 | Tatsuta et al. ................ | 349/158 |
| 2003/0225201 | A1 * | 12/2003 | Yamana .................. | B32B 27/34 |
| | | | | 524/589 |
| 2005/0084686 | A1 * | 4/2005 | Imaizumi ........... | C08G 18/0823 |
| | | | | 428/425.5 |
| 2009/0280333 | A1 * | 11/2009 | Kuwata et al. ............ | 428/423.7 |

FOREIGN PATENT DOCUMENTS

| | | |
|---|---|---|
| CN | 101272904 A | 9/2008 |
| EP | 1081170 B1 | 4/2010 |
| JP | 6-093133 A | 4/1994 |
| JP | 9-150484 A | 6/1997 |
| JP | 11-165369 A | 6/1999 |
| JP | 2001-080003 A | 3/2001 |
| JP | 2001-98047 A | 4/2001 |
| JP | 2001-287294 A | 10/2001 |
| JP | 3351208 B2 | 9/2002 |
| JP | 2004-035831 A | 2/2004 |

(Continued)

OTHER PUBLICATIONS

International Search Report issued May 28, 2013 in PCT/JP2013/055221 (with English Translation).

(Continued)

*Primary Examiner* — Thao T Tran
(74) *Attorney, Agent, or Firm* — Oblon, McClelland, Maier & Neustadt, L.L.P.

(57) ABSTRACT

A gas barrier film includes a base film including a plastic material, and one or more gas barrier layers formed on the base film. The gas barrier layer includes an inorganic layered mineral and a resin component interposed between layers of the inorganic layered mineral. The gas barrier film shows an X-ray diffraction spectrum having a first peak top and a second peak top when measured at 25° C. and 65% RH using CuKα rays, the first peak top is derived from a first interlayer distance between adjacent layers of the inorganic layered mineral, the second peak top is derived from a second interlayer distance which is greater than the first interlayer distance by interposition of the resin component between layers of the inorganic layered mineral, and the second peak top is present at a position lower than a position of the first peak top in a 2θ axis.

19 Claims, 2 Drawing Sheets

(56) References Cited

FOREIGN PATENT DOCUMENTS

| JP | 2005-212107 A | 8/2005 |
| JP | 2005-225078 A | 8/2005 |
| JP | 3764109 B2 | 1/2006 |
| JP | 4434907 B2 | 1/2010 |
| JP | 2013-059930 A | 4/2013 |

OTHER PUBLICATIONS

Office Action and Search Report issued on Jul. 24, 2015 in the corresponding Chinese patent Application No. 201380011208.7 (with English Translation).
Office Action issued on Jun. 21, 2016 in Japanese Patent Application No. 2014-502331 (with English translation).

\* cited by examiner

GAS BARRIER FILM

CROSS-REFERENCE TO RELATED APPLICATIONS

The present application is a continuation of International Application No. PCT/JP2013/55221, filed Feb. 27, 2013, which is based upon and claims the benefits of priority to Japanese Application No. 2012-041252, filed Feb. 28, 2012. The entire contents of these applications are incorporated herein by reference.

TECHNICAL FIELD

The present invention relates to a gas barrier film used in the packaging fields of food products, such as dried food, sweets, breads or delicacies, which hate moisture and oxygen, and also in the packaging fields of pharmaceutical products, such as disposable body warmers, tablets, powders or poultices/adhesive skin patches. More specifically, the present invention relates to a gas barrier film used in the packaging fields wherein high-level gas barrier properties and transparency that enables product recognition are desired.

BACKGROUND ART

Packaging materials used for packaging food products or pharmaceutical products preferably have properties (gas barrier properties) for cutting off the entry of moisture, oxygen and other gases that degrade the packaged food and pharmaceutical products to suppress degradation and decay of the products and retain the functions and nature of the products.

SUMMARY OF THE INVENTION

According to one aspect of the present invention, a gas barrier film includes a base film including a plastic material, and one or more gas barrier layers formed on the base film. The gas barrier layer includes an inorganic layered mineral and one or more resin components interposed between layers of the inorganic layered mineral. The gas barrier film shows an X-ray diffraction spectrum having a first peak top and a second peak top when measured at 25° C. and 65% RH using CuKα rays, the first peak top is derived from a first interlayer distance between adjacent layers of the inorganic layered mineral, the second peak top is derived from a second interlayer distance which is greater than the first interlayer distance by interposition of the resin component between layers of the inorganic layered mineral, and the second peak top is present at a position lower than a position of the first peak top in a 2θ axis.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

A gas barrier film according to an embodiment of the present invention is now described.

It will be noted that this embodiment is provided to explain the present invention in detail for much better understanding of the concept thereof, but should not be construed as limiting the invention thereto unless otherwise specified.

A gas barrier film of the present embodiment includes a base film made of a plastic material, and a gas barrier layer formed on either one or both surfaces of the base film and comprised of an inorganic layered mineral and at least one resin component that is interposed between layers of the inorganic layered mineral. When X-ray diffraction spectra of the gas barrier layer are measured using CuKα rays in an atmosphere of 25° C. and 65% RH, the X-ray diffraction spectra show a first peak top and a second peak top which correspond to interlayer distances in the inorganic layered mineral. The first peak top is derived from an interlayer distance of the thin films comprised of the inorganic layered mineral alone. The second peak top is derived from the interlayer distance of the inorganic layered mineral being increased due to the interposition of the resin component between layers of the inorganic layered minerals. The second peak top is present at a position lower than a position of the first peak top in a 2θ axis.

The X-ray diffraction is an analysis method of obtaining information on an "arrangement" of atoms such as of crystals.

When crystals are irradiated with X-rays in the X-ray diffraction, the X-rays are reflected from the lattice planes of the crystals and interfere one another. Thus, only the diffraction lines in a direction of satisfying the following Formula (1) increase their intensities and those which do not satisfy the requirement cancel with one another and are not observed.

$$2d \sin \theta = n\lambda \quad (1)$$

Monochromatic X-rays having a given wavelength λ are irradiated on the crystals to observe θ. From θ and Formula (1), a lattice spacing (spacing in the crystal lattice planes) d is calculated. It will be noted that in the above Formula (1), n represents a phase difference between mutually interfering waves. In the present embodiment, a primary diffraction line (n=1) is normally used.

As will be described later, the inorganic layered mineral has a crystal structure that is composed of one to three tetrahedral or octahedral layers of about 0.22 nm in thickness, each being mainly comprised of oxygen and silicon. The crystal structure is constituted of a sheet-shaped, layered inorganic compound having a size of about several 10 nm to 5 μm along a direction of major axis and a large aspect ratio. Macroscopically, the inorganic layered mineral is present in a state where most of the sheets of the layered inorganic compound are regularly stacked.

Further, the inorganic layered mineral enables insertion of inorganic ions or an organic compound in a given arrangement between the layers (interlayer) of the inorganic layered mineral. Where the inorganic layered mineral is natural clay, cationic inorganic ions such as of sodium or calcium are adsorbed between the crystal layers to compensate minus electric charge possessed by the layered inorganic compound and serve to combine the layered inorganic compound in the form of sheets thereby forming a well-regulated layered structure.

Generally, the inorganic layered minerals having sodium ions between the crystal layers are hydrophilic and have a property of swelling in water. These water-swellable inorganic layered minerals are mixed well in water with a substance that is dissolved or uniformly dispersed in water, followed by drying the mixture of the inorganic layered compound and the substance on an arbitrary support. In many cases, this will result in a composite product in which the substance is inserted between the layers of the inorganic layered mineral.

For example, a polyvinyl alcohol solution is mixed, in water, with a water-swellable inorganic layered mineral, followed by coating, onto a base, and drying the mixture of the polyvinyl alcohol and the inorganic layered mineral to obtain a composite film wherein the polyvinyl alcohol is inserted between the layers of the inorganic layered mineral. This composite film is capable of suppressing the hygroscopic and swellable properties of the polyvinyl alcohol inserted between the layers of the inorganic layered mineral. Further, a permeated gas is interrupted by means of the crystal layers of the inorganic layered mineral on the base to elongate the permeation path (labyrinth effect), thereby revealing that the gas barrier properties are improved in a high-humidity atmosphere.

When an X-ray diffraction is measured for the inorganic layered mineral having such a structure, a distance between layers (interlayer distance) of the inorganic layered mineral can be determined from the resultant X-ray diffraction spectra.

Since an inorganic layered mineral and the composite film form a well-regulated layered structure with inorganic ions or an organic compound being inserted between the layers, measurement of X-ray diffraction spectra using CuKα rays demonstrates a clear bottom reflection peak corresponding to the interlayer distance of the inorganic layered mineral. Further, with water-swellable inorganic layered minerals, the amount of hydrated water interposed between the layers is changed depending on the humidity environment and thus, the interlayer distance varies.

In this regard, in the present embodiment, a gas barrier layer that contains an inorganic layered mineral is sufficiently subjected to moisture conditioning in an atmosphere of 25° C. and 65% RH, and then an X-ray diffraction of the gas barrier layer is measured by use of CuKα rays.

In the present embodiment, the expression that the "gas barrier layer . . . is sufficiently subjected to moisture conditioning" refers to that the gas barrier layer is allowed to stand in the atmosphere of 25° C. and 65% RH for not less than 24 hours.

For example, when X-ray diffraction spectra are measured under these conditions for thin films made of a generally known water-swellable synthetic mica wherein sodium is present between the layers, a peak is detected at a diffraction angle of 2θ=7 degrees. As will be understood, this indicates an interlayer distance of d=12.6 Å with one hydration layer being formed between the crystal layers.

In contrast thereto, for example, with a composite film which is formed by mixing an inorganic layered compound, such as water-swellable synthetic mica, with polyvinyl alcohol at a mass ratio of 1:1 and in which the polyvinyl alcohol is inserted between the layers of the inorganic layered mineral, it is usual that the bottom reflection peak at 2θ position (in the vicinity of about 7 degrees) substantially disappears, which is detected in the sample made of the inorganic layered mineral alone, but, instead, a new peak is detected only at a lower 2θ side relative to this position (in the vicinity of about 7 degrees).

However, when X-ray diffraction spectra of the gas barrier layer of the present embodiment are measured using CuKα rays in an atmosphere of 25° C. and 65% RH, the X-ray diffraction spectra show a first peak top and a second peak top corresponding to interlayer distances in the inorganic layered mineral, respectively. The first peak top is at a position which is derived from the interlayer distance of thin films comprised of the inorganic layered mineral alone. The second peak top is at a position that is a position at a lower 2θ side relative to the position of the first peak top, that is, a position derived from the interlayer distance of the inorganic layered mineral being increased due to the interposition of the resin component between the layers of the inorganic layered mineral. In other words, in the X-ray diffraction spectra, the gas barrier layer of the present embodiment has peaks at both of the first peak top position and the second peak top position.

In the present embodiment, an X-ray diffraction of the gas barrier film may be measured directly on a surface of the gas barrier layer comprised of an inorganic layered mineral and at least one resin component interposed between the layers of the inorganic layered mineral. Alternatively, an X-ray diffraction may be measured on the gas barrier film which is formed by forming, on a glass plate, a thin film of a coating material for forming a gas barrier layer and drying the thin film.

For example, the base film made of a plastic material includes those films made of: olefin resins including poly C2-10, such as polyethylene, polypropylene, propylene-ethylene copolymer and the like; polyester resins including polyethylene terephthalate, polybutylene terephthalate and the like; polyamide resins including aliphatic polyamides, such as nylon 6, nylon 66 and the like, and aromatic polyamides, such as polymethaxylylene adipamide; vinyl resins including polystyrene, polyvinyl acetate, ethylene-vinyl acetate copolymer, polyvinyl alcohol, ethylene-vinyl-alcohol copolymer and the like; acryl resins including homopolymer or copolymer of meth(acryl) monomers, such as polymethyl methacrylate, polyacrylonitrile and the like; and cellophane. These resins may be used singly or in combination of two or more.

The base film used includes a single-layer film comprised of a single resin, and a single-layer or laminated film comprised of a plurality of resins. Alternatively, these resins may be stacked on a different base (metal, wood, paper, ceramics, or the like) for use as a stacked-layer base.

Among them, a polyolefin resin film (particularly, a polypropylene film or the like), a polyester resin film (particularly, a polyethylene terephthalate resin film), a polyamide resin film (in particular, a nylon film), or the like is preferred for use as a base film.

The base film may be an unstretched film or a uniaxially- or biaxially-stretched oriented film, or may be a film subjected to surface treatment (e.g., corona discharge treatment) or subjected to anchor coating or undercoating. Alternatively, the base film may be a laminated film in which a plurality of resins or metals are stacked.

When the base film is subjected to corona treatment or low-temperature plasma treatment on a surface to be coated (a surface on which a film is formed), there are obtained good wettability to a coating agent and adhesion strength for film.

The thickness of the base film is not particularly limited but may be appropriately selected depending on the cost or usage while taking account of the adaptability as a packaging material or the adaptability for lamination with other type of film. Practically, the thickness is 3 to 200 µm, preferably 5 to 120 µm, and more preferably 10 to 100 µm.

The gas barrier layer of the present embodiment includes a gas barrier layer comprised of an inorganic layered mineral and at least one resin component interposed between the layers of the inorganic layered mineral. The gas barrier layer of the present embodiment may be made of suitable materials as long as X-ray diffraction spectra measured by CuKα rays in an atmosphere of 25° C. and 65% RH satisfies the following. The peak tops corresponding to interlayer distances in the inorganic layered mineral are at a position of a peak top (first peak top position) derived from the interlayer distance of thin films comprised of the inorganic layered mineral alone and at a position of a peak top (second peak top position) that is derived from the interlayer distance being increased in the inorganic layered mineral toward a lower 2θ side relative to the first peak top position due to the resin component. In the gas barrier layer of the present embodiment, the inorganic layered mineral preferably contains a water-swellable synthetic mica, and the resin component preferably contains a water-soluble resin and a water-insoluble resin. Further, the water-soluble resin is preferably a polyvinyl alcohol resin and the water-insoluble resin is preferably a polyurethane resin.

The inorganic layered mineral means an inorganic compound in which extremely thin unit crystal layers are superposed to form a single layered particle.

The inorganic layered mineral is preferably one which swells and cleaves in water. Among them, clay compounds, in particular, having water-swellable properties are preferably used. More specifically, mention is made of clay compounds wherein water is coordinated between extremely thin unit crystal layers to impart absorptive and swellable properties thereto. In general, such a clay compound has a layered structure wherein layers having a tetrahedral structure in which $Si^{4+}$ is coordinated with $O^{2-}$, and layers having an octahedral structure in which $Al^{3+}$, $Mg^{2+}$, $Fe^{2+}$, $Fe^{3+}$ or the like is coordinated with $O^{2-}$ and $OH^-$, are bonded at 1:1 or 2:1 and built up. The clay compound may be a natural or synthetic one.

As a typical inorganic layered mineral, mention is made of hydrous silicates, such as phyllosilicate minerals, including, for example: kaolinite clay minerals, such as halloysite, kaolinite, hydrohalloysite, dickite and nacrite; antigorite clay minerals, such as antigorite and chrysotile; smectite clay minerals, such as montmorillonite, beidellite, nontronite, saponite, hectorite, sauconiate and stevensite; vermiculite clay minerals, such as vermiculite; and micas or mica clay minerals including micas, such as white mica and bronze mica, and mica clay minerals, such as margarite, tetra-silicic mica and taeniolite.

These inorganic layered minerals may be used singly or in combination of two or more.

Of these inorganic layered minerals, smectite clay minerals, such as montmorillonite, or mica clay minerals, such as water-swellable mica, are particularly preferred.

The size of the inorganic layered mineral is preferably such that an average particle size is at not more than 10 µm and a thickness is at not more than 500 nm. It is especially preferred that at least one of these inorganic layered minerals used is a water-swellable synthetic mica having an average particle size of 1 to 10 µm and a thickness of 10 to 100 nm.

When used as an inorganic layered mineral, water-swellable synthetic mica, which contains less impurities compared to natural mica, does not serve to lower the gas barrier properties or the film cohesiveness, which is derived from the impurities. Further, water-swellable synthetic mica, which contains fluorine atoms in the crystal structure, also contributes to minimizing the humidity dependence of the gas barrier properties of the gas barrier layer. Thus, comparing with other types of water-swellable inorganic layered minerals, water-swellable synthetic mica has a high aspect ratio and hence can more effectively exert a labyrinth effect, thereby particularly contributing to more developing the gas barrier properties of the gas barrier layer.

The water-soluble resin means a polymer that can be completely dissolved or finely dispersed in water at a normal temperature.

The water-soluble resin is not particularly limited as far as it can be inserted or coordinated (intercalated) between the unit crystal layers of the inorganic layered mineral. For example, the water-soluble resin include: polyvinyl alcohol and its derivatives; cellulose derivatives, such as carboxymethylcellulose or hydroxyethylcellulose; starches, such as oxidization starch, etherified starch or dextrin; vinyl polymer including polyvinylpyrrolidone, polyacrylic acid, polymethacrylic acid or ethers and salts of polymethacrylic acid, and copolymers thereof, copolymerized polyesters containing a polar group such as of sulfoysophthalic acid, and copolymers of polyhydroxyethylmethacrilate and polyhydroxyethylmethacrilate; urethane polymers; or functional group modified copolymers, such as a carboxyl group of various types of polymers indicated above.

Of such water-soluble resins, at least one type used is preferably a polyvinyl alcohol-based polymer and a derivative of the polyvinyl alcohol-based polymer. A polyvinyl alcohol resin having a degree of saponification of not less than 95% and a degree of polymerization of 300 to 2500 is more preferred. Much more preferably, the polyvinyl alcohol resin has a degree of saponification of not less than 95% and a degree of polymerization of 300 to 2000. With a polyvinyl alcohol resin, higher degrees of saponification and polymerization result in poorer hygroscopic and swellable properties.

When the degree of saponification of polyvinyl alcohol resin is lower than 95% is used, gas barrier properties lower. Further, when the degree of polymerization of polyvinyl alcohol resin is lower than 300 is used, gas barrier properties lower. On the other hand, a polyvinyl alcohol resin having a polymerization degree exceeding 2000 raises the viscosity of an aqueous coating agent, thus making it difficult to uniformly mix with other components, with some cases where gas barrier properties and adhesiveness lower.

The water-insoluble resin means a polymer that is insoluble or non-dispersible in water at a normal temperature.

The water-insoluble resin is not particularly limited. In order to form a gas barrier film by coating, on a base film, an aqueous coating agent containing gas barrier layer, an inorganic layered mineral, a water-soluble resin and a water-insoluble resin, a preferred water-insoluble resin is one which is able to be uniformly dispersed in the form of fine particles in water or in a solvent uniformly miscible with water and becomes insolubilized in water by heating after coating as a result of physical fusion or crosslinkage/polymerization. Of such water-insoluble resins, a polyurethane resin is particularly preferred because of its inexpensiveness and excellent stability.

The polyurethane resin is preferably an aqueous polyurethane resin composition containing a polyurethane resin (A) having a total concentration of a urethane group and a urea group of not less than 15 mass % (e.g., 25 to 60 mass %) and having an acid group, and a polyamine compound (B).

The polyurethane resin (A) used is one which is an aqueous polyurethane resin prepared by reaction of a polyisocyanate compound (a), a polyhydroxy acid (b), a polyol component (c) that contains not less than 90 mass % of C2-6 alkylene glycol, and a chain extender component (d), followed by neutralization using a neutralizing agent.

The polyisocyanate compound (a) may contain at least one selected from the group of aromatic, araliphatic and alicyclic polyisocyanates (e.g., may contain not less than 30 mass % of at least one selected from the group of aromatic, araliphatic and alicyclic polyisocyanates).

Further, the polyisocyanate compound (a) may be a polyisocyanate made of at least one selected from xylylene diisocyanate and hydrogenated xylylene diisocyanate (e.g., may be a polyisocyanate that contains not less than 20 mass % of at least one selected from xylylene diisocyanate and hydrogenated xylylene diisocyanate).

For example, the polyhydroxy acid (b) used is at least one organic acid selected from the group of polyhydroxycarboxylic acid and polyhydroxysulfonic acid.

The chain extender component (d) may be, for example, at least one selected from a diamine, water, hydrazine and hydrazine derivatives.

The polyurethane resin (A) may be an aqueous dispersion in water, or may be an aqueous solution dissolved in water.

As the polyamine compound (B), various polyamines are used, which have two or more basic nitrogen atoms selected from the group consisting of a primary amino group, a secondary amino group and a tertiary amino group. The polyamine compound (B) is at least one compound selected, for example, from alkylene diamines, hydroxyl containing diamines, polyalkylene polyamines, N-alkyl substituted alkylene diamines, N-alkyl substituted polyalkylene polyamines, alicyclic polyamines, aromatic polyamines, adducts obtained by adding an alkylene oxide to these polyamine compounds, and urethane modified polyamine compounds.

The amine number of the polyamine compound (B) is about 100 to 1900 mg KOH/g.

The formulation ratio of the polyurethane resin (A) and the polyamine compound (B) is selected from a range of about 10/1 to 1/10, in terms of an equivalence ratio of the acid group in the polyurethane resin (A) and the basic nitrogen atoms (or amino group) in the polyamine compound (B).

The polyamine compound (B) can bond to the acid group of the polyurethane resin (A). Specifically, in the aqueous polyurethane resin composition having such a formulation, the acid group of the polyurethane resin (A) that contains a urethane group and a urea group of high concentrations is ionically bonded with the amino group of the polyamine compound (B) to achieve a high degree of crosslinkage. The composition is useful for forming a gas barrier layer having excellent gas barrier properties against oxygen, moisture, aroma components or the like.

The gas barrier layer of the present embodiment is formed by coating an aqueous coating agent, which contains an inorganic layered mineral, a water-soluble resin and a water-insoluble resin, on a base film according to a well-known wet coating method, followed by drying and removing solvent components.

The wet coating method includes roll coating, gravure coating, reverse coating, die coating, screen printing, spray coating or the like.

Using these wet coating methods, the aqueous coating agent is coated onto either one or both surfaces of the base film.

For the method of drying the aqueous coating agent, there is used a known drying method, such as hot-air drying, hot-roll drying, infrared-ray irradiation or the like.

The thickness of the gas barrier layer formed on the base film is determined in accord with intended gas barrier properties, but is preferably at 0.1 to 5 µm, more preferably at 0.2 to 2 µm.

If the gas barrier layer is less than 1 µm in thickness, satisfactory gas barrier properties are unlikely to be obtained. On the other hand, the thickness of the gas barrier layer exceeding 5 µm is unfavorable because not only a difficulty is involved in the formation of a uniform coating film surface, but also a drying load and production cost increases.

The gas barrier layer may contain various types of additives within ranges not impairing the gas barrier properties or strength as a laminate film for packaging.

Examples of the additives include a reactive curing agent such as of polyisocyanate, carbodiimide, epoxy compound, oxazolidone compound, aziridine compound or the like, an antioxidant, a weathering agent, a thermal stabilizer, a lubricant, a crystal nucleating agent, an ultraviolet absorber, a plasticizer, a colorant, a filler, a surface active agent, a silane coupling agent, and the like.

The gas barrier film of the present embodiment is stacked with a heat-sealable layer that enables heat sealing to thereby form a gas barrier packaging laminate film that ensures hermetic sealing by heat sealing.

For the gas barrier film of the present embodiment, the heat-sealable layer that enables heat sealing may be stacked using a well-known dry lamination method, extrusion lamination method or the like, and using a known adhesive agent such as of a polyurethane, a polyester or a polyether.

As desired, the gas barrier film of the present embodiment may be provided with a printed layer, anchor coat layer, overcoat layer, light shield layer, adhesive layer, heat sealing layer, or the like.

The gas barrier film of the present embodiment includes a base film made of a plastic material, and a gas barrier layer formed on either one or both surfaces of the base film and comprised of an inorganic layered mineral and at least one resin component interposed between layers of the inorganic layered mineral. When X-ray diffraction spectra of the gas barrier layer are measured using CuKα rays in an atmosphere of 25° C. and 65% RH, the X-ray spectra show a first peak top and a second peak top corresponding to interlayer distances in the inorganic layered mineral. The first peak top is derived from the interlayer distance of thin films that are comprised of the inorganic layered mineral alone, while the second peak top is derived from the interlayer distance in the inorganic layered minerals being increased due to the interposition of the resin components between the layers of the inorganic layered mineral. Since the second peak top is present at a position lower than the position of the first peak top in 2θ axis, the gas barrier film of the present embodiment exerts high gas barrier properties and sufficient adhesiveness as a packaging laminate film in a high-humidity atmosphere.

The gas barrier film of the present embodiment contains a water-swellable synthetic mica as a component of the gas barrier layer or particularly as an inorganic layered mineral, and contains a water-soluble resin and a water-insoluble resin as resin components. It is particularly preferable that the water-soluble resin is a polyvinyl alcohol resin and the water-insoluble resin is a polyurethane resin. Thus, the gas barrier film contains no sources that would generate harmful substances when discarded. Further, the gas barrier film of the present embodiment has excellent gas barrier properties in a high-humidity atmosphere and has a sufficient lamination strength as a packaging laminate film as well when laminated with a different functional resin film. In this way, the gas barrier film of the present embodiment, when used as various packaging containers, can exert high properties for retaining the quality of contents over a much longer period and thus can be utilized as various packaging materials.

In the gas barrier film of the present embodiment, the gas barrier layer is provided, on its surface, with a protective layer. The protective layer may be formed using wet coating, similar to the formation of the gas barrier layer. It will be noted that using a multi-color coater, the protective layer may be formed in an in-line manner concurrently with the process of coating the gas barrier layer, or the protective layer may be formed in an in-line manner preceding the adhesive coating in a laminating process described later.

The materials used for forming the protective layer are not particularly limited as far as the materials do not degrade the gas barrier properties and the lamination strength of the gas barrier film. For example, the materials used may be polyurethanes, isocyanates, polybutadienes, polyethyleneimines, polyesters, acryl polyols, epoxies, styrene acrylics, polyacrylics, polyamides or polysiloxanes. From the standpoint of suppressing degradation of the lamination strength with time, polyurethanes, isocyanates, polybutadienes, polyethyleneimines, polyesters or acryl polyols are particularly preferred because commercially sold materials are abundant and inexpensive.

In the gas barrier film of the present embodiment, the protective layer is interposed between the gas barrier layer and an adhesive layer to enhance temporal stability of the lamination strength. The gas barrier film having such a gas barrier coating film, which is comprised of an inorganic layered compound and resins, may be peeled off due to cohesion failure of the gas barrier coating film. This is assumed as follows: when the gas barrier layer is in direct contact with the adhesive layer, the components of the gas barrier layer interact with the components of the adhesive in the vicinity of the adhesive interface of the gas barrier layer to thereby form a layer that is different in nature from the gas barrier layer. This would cause a change in physical properties, such as an expansion coefficient, would accumulate strain between the layers with time, and would lower lamination strength with time. In the gas barrier film of the present embodiment, the protective layer shields the gas barrier layer and the adhesive layer therewith to effectively prevent formation of a layer that would result from the interaction between the components of the gas barrier layer and the components of the adhesive. Thus, the gas barrier film has such an effect that while initial lamination strength is kept, the occurrence of delamination failure is reduced.

It will be noted that the term delamination means that, in a gas barrier film having a heat sealing resin layer laminated thereon via an adhesive, the lamination strength is lowered with time and part of the laminate film is peeled off when kept in a high-humidity atmosphere over a long time.

Further, the gas barrier film of the present embodiment is provided with a heat sealing resin layer via the adhesive layer by a laminating process. For the heat sealing resin layer, there may be used a polyolefin film such as of low density polyethylene, linear low density polyethylene, medium density polyethylene, or polypropylene, a polyester copolymer film, a polyacrylonitrile film, a vinyl acetate copolymer film, or the like. The polyolefin film is particularly preferred because of its excellent low temperature heat sealing properties and inexpensiveness.

The lamination method may be a well-know dry lamination method, extrusion lamination method or non-solvent lamination method.

Various adhesives may be selected and used for the adhesive layer in accord with the respective lamination methods. For example, well-known adhesives may be used such as of polyurethanes, polyesters, polyethers, epoxies, polyethyleneimines, polybutadienes, or the like.

The gas barrier film of the present embodiment may have a printed layer, an anchor coat layer, a light shield layer or other functional layers, as necessary.

The gas barrier film of the present embodiment includes a base film made of a plastic material, which is successively stacked thereon with at least a gas barrier layer, a protective layer, an adhesive layer and a heat sealing resin layer. The gas barrier layer is comprised of an inorganic layered mineral and at least one resin component interposed between layers of the inorganic layered mineral. When X-ray diffraction spectra are measured for the gas barrier layer using CuKα rays in an atmosphere of 25° C. and 65% RH, the X-ray diffraction spectra show a first peak top and a second peak top corresponding to interlayer distances in the inorganic layered mineral. The first peak top is derived from the interlayer distance of thin films comprised of the inorganic layered mineral alone. The second peak top is derived from an increased interlayer distance in the inorganic layered mineral due to the interposition of the resin components between the layers of the inorganic layered mineral. Since the second peak top is present at a position lower than the position of the first peak top in 2θ axis, and further, since a protective layer is interposed between the gas barrier layer and the adhesive layer, the gas barrier film of the present embodiment exerts excellent gas barrier properties and good adhesiveness and cohesiveness. Further, when kept in a high-humidity atmosphere for a long time, the gas barrier film of the present embodiment minimizes degradation with time of the lamination strength and does not cause delamination failure. Accordingly, the gas barrier film of the present embodiment can enhance quality retention of package contents over a long period and thus can be utilized as various packaging materials. In addition, the generation of harmful substances can be suppressed to a lesser extent at the time of disposal.

EXAMPLES

Hereinafter, the present invention is more specifically described by way of examples and comparative examples, which should not be construed as limiting the invention thereto.

Example 1

A water-swellable synthetic mica (SOMASIF MEB-3 manufactured by Co-op Chemical Co., Ltd.) was used as an inorganic layered mineral, a 5% aqueous solution of polyvinyl alcohol resin (Poval PVA-124 manufactured by Kuraray Co., Ltd.), was used as a water-soluble resin, and a polyurethane dispersion (TAKELAC™ WPB-341 manufactured by Mitsui Chemicals, Inc.), was used as a water-insoluble resin, followed by setting solid formulation ratios at 20/20/60 on mass basis heating at 80° C. and mixing. After that, the mixture of the water-swellable synthetic mica, the polyvinyl alcohol resin and the polyurethane dispersion was cooled down to room temperature, followed by diluting the mixture with ion-exchanged water and isopropanol so that 10 mass % of the solvent was constituted of isopropanol and the solid content was at 8 mass %. Immediately before coating, a curing agent (aqueous polyisocyanate TAKENATE™ WD-725 manufactured by Mitsui Chemicals, Inc.) was added to the mixture by 15 mass % relative to the solid content of the polyurethane dispersion to thereby prepare an aqueous coating agent of Example 1.

The aqueous coating agent of Example 1 was coated onto a corona-treated surface of a biaxially stretched polypropylene film U-1 (20 μm thick) manufactured by Mitsui Chemicals Tohcello, Inc., using a gravure coater so that the dry coating weight was 1 g/m$^2$. The resultant was passed through an oven at 90° C. for 10 seconds for drying to form a gas barrier layer, thereby obtaining a gas barrier film of Example 1.

Example 2

A water-swellable synthetic mica (SOMASIF MEB-3 manufactured by Co-op Chemical Co., Ltd.) was used as an inorganic layered mineral. A 5% aqueous solution of polyvinyl alcohol resin (Poval PVA-105 manufactured by Kuraray Co., Ltd.) was used as a water-soluble resin. A polyurethane dispersion (TAKELAC™ WPB-341 manufactured by Mitsui Chemicals, Inc.) was used as a water-insoluble resin, followed by setting solid formulation ratios at 20/10/70 on mass basis, heating at 80° C. and mixing. Thereafter, the mixture was cooled down to room temperature, followed by diluting the mixture of the water-swellable synthetic mica, polyvinylalcohol resin and polyurethane dispersion with ion-exchanged water and isopropanol so that 10 mass % of the solvent was constituted of isopropanol and the solid content was 8 mass %. Immediately before coating, a curing agent (aqueous polyisocyanate TAKENATE™ WD-725 manufactured by Mitsui Chemicals, Inc.) was added to the mixture at 15 mass % relative to the solid content of the polyurethane dispersion to thereby prepare an aqueous coating agent of Example 2.

The aqueous coating agent of Example 2 was coated onto a corona-treated surface of a biaxially stretched polypropylene film U-1 (20 μm thick) manufactured by Mitsui Chemicals Tohcello, Inc., using a gravure coater so that the dry coating weight was 1 g/m$^2$. The resultant was passed through an oven at 90° C. for 10 seconds for drying to form a gas barrier layer, thereby obtaining a gas barrier film of Example 2.

Example 3

A 5% aqueous dispersion of montmorillonite (Kunipia-F manufactured by Kunimine Industries Co., Ltd.) was used as an inorganic layered mineral. A 2% aqueous solution of sodium carboxymethyl cellulose was used as a water-soluble resin. A polyurethane dispersion (TAKELAC™ WPB-341 manufactured by Mitsui Chemicals, Inc.) was used as a water-insoluble resin, followed by setting solid formulation ratios at 20/10/70 on mass basis, heating at 80° C. and mixing. Thereafter, the mixture was cooled down to room temperature, followed by diluting the mixture of the montmorillonite, sodium carboxymethyl cellulose and polyurethane resin with ion-exchanged water and isopropanol so that 10 mass % of the solvent was constituted of isopropanol and the solid content was 8 mass %. Immediately before coating, a curing agent (aqueous polyisocyanate TAKENATE™ WD-725 manufactured by Mitsui Chemicals, Inc.) was added to the mixture at 15 mass % relative to the solid content of the polyurethane dispersion to thereby prepare an aqueous coating agent of Example 3.

The aqueous coating agent of Example 3 was coated onto a corona-treated surface of a biaxially stretched polypropylene film U-1 (20 μm thick) manufactured by Mitsui Chemicals Tohcello, Inc., using a gravure coater so that the dry coating weight was 1 g/m$^2$. The resultant was passed through an oven at 90° C. for 10 seconds for drying to form a gas barrier film, thereby obtaining a gas barrier film of Example 3.

Comparative Example 1

Montmorillonite (Kunipia-F manufactured by Kunimine Industries Co., Ltd.) was uniformly dispersed in a mixed solvent of ion-exchanged water and isopropanol having a mass ratio of 9/1 so that the solid content was 5 mass % to thereby prepare a coating agent comprised of a dispersion of montmorillonite.

This coating agent was coated onto a corona-treated surface of a biaxially stretched polypropylene film U-1 (20 μm thick) manufactured by Mitsui Chemicals Tohcello, Inc., using a gravure coater so that the dry coating weight was 1 g/m$^2$. The resultant was passed through an oven at 90° C. for 10 seconds for drying to form a coating film, thereby obtaining a gas barrier film of Comparative Example 1.

Comparative Example 2

A water-swellable synthetic mica (SOMASIF MEB-3 manufactured by Co-op Chemical Co., Ltd.) and a 5% aqueous solution of polyvinyl alcohol resin (Poval PVA-124 manufactured by Kuraray Co., Ltd.) were provided at a solid formulation ratio of 50/50 on mass basis heated and mixed together. After that, the mixture of the water-swellable synthetic mica and the polyvinyl alcohol resin was cooled down to room temperature, followed by diluting the mixture with ion-exchanged water and isopropanol so that 10 mass % of the solvent was constituted of isopropanol and the solid content was 3 mass %. Thus, a coating agent comprised of a mixed solution of the water-swellable synthetic mica and the polyvinyl alcohol resin was prepared.

This coating agent was coated onto a corona-treated surface of a biaxially stretched polypropylene film U-1 (20 μm thick) manufactured by Mitsui Chemicals Tohcello, Inc., using a gravure coater so that the dry coating weight was 0.5 g/m$^2$. The resultant was passed through an oven at 90° C. for 20 seconds for drying to form a coating film, thereby obtaining a gas barrier film of Comparative Example 2.

Comparative Example 3

A water-swellable synthetic mica (SOMASIF MEB-3 manufactured by Co-op Chemical Co., Ltd.) and a polyurethane dispersion (TAKELAC™ WPB-341 manufactured by Mitsui Chemicals, Inc.) were mixed at a solid formulation ratio of 30/70 on mass basis. After that, the mixture of the water-swellable synthetic mica and the polyurethane dispersion was diluted with ion-exchanged water and isopropanol so that 10 mass % of the solvent was constituted of isopropanol and the solid content was 8 mass %. Immediately before coating, a curing agent (aqueous polyisocyanate TAKENATE™ WD-725 manufactured by Mitsui Chemicals, Inc.) was added to the mixture at 15 mass % relative to the solid content of the polyurethane dispersion to thereby prepare a coating agent comprised of the mixed solution of the water-swellable synthetic mica and the polyurethane dispersion.

This coating agent was coated onto a corona-treated surface of a biaxially stretched polypropylene film U-1 (20 μm thick) manufactured by Mitsui Chemicals Tohcello, Inc., using a gravure coater so that the dry coating weight was 1 g/m². The resultant was passed through an oven at 90° C. for 10 seconds for drying to form a coating film, thereby obtaining a gas barrier film of Comparative Example 3.

Evaluation (X-Ray Diffraction Measurement)

The gas barrier films of Examples 1-3 and Comparative Examples 1-3 were allowed to stand in an atmosphere of 25° C. and 65% RH for not less than 24 hours. After that, in the same atmosphere, X-ray diffraction spectra of the gas barrier films were measured using RAD-rX (X-ray source=CuKα, λ=0.154 nm, voltage 40 kV, current 40 mA) manufactured by Rigaku Corporation. The results are shown in FIGS. 1 to 6.

(Oxygen Gas Barrier Properties and Moisture Barrier Properties)

For the gas barrier films of Examples 1-3 and Comparative Examples 1-3, oxygen gas barrier properties were measured in an atmosphere of 20° C. and 80% RH using an oxygen permeability measuring apparatus (OXTRAN-2/20 manufactured by MOCON, Inc.). The results are shown in Table 1.

Further, for the gas barrier films of Examples 1-3 and Comparative Examples 1-3, moisture barrier properties were measured in an atmosphere of 40° C. and 90% RH using a moisture permeability measuring apparatus (PERMATRAN-3/31 manufactured by MOCON, Inc.). The results are shown in Table 1.

(Lamination Strength)

An unstretched polypropylene film (CPP GLC manufactured by Mitsui Chemicals Tohcello, Inc.) of 30 μm in thickness was laminated on a coating surface of each of the gas barrier films of Examples 1-3 and Comparative Examples 1-3 via a polyester urethane adhesive (TAKELAC™ A-525 manufactured by Mitsui Chemicals, Inc./ TAKENATE™ A-52 manufactured by Mitsui Chemicals, Inc.), using a dry lamination process. The resultant was cured (aged) at 40° C. for 48 hours to thereby obtain a stacked-layer film.

The laminated films were each cut into strips of 15 mm in width wide. Then, using a tension tester Tensilon, the gas barrier films were subjected to 90 degree peeling at a speed of 300 mm/min to thereby measure lamination strength. The results are shown in Table 1.

TABLE 1

| | Example 1 | Example 2 | Example 3 | Comparative Example 1 | Comparative Example 2 | Comparative Example 3 |
|---|---|---|---|---|---|---|
| Distance between crystal layers (Å) | 13.4 26.8 | 13.4 23.4 | 12.3 25.7 | 12.3 — | — 26.9 | 13.4 — |
| Oxygen permeability (cc/m² · day) | 2.2 | 2 | 3.6 | >50 | 2.3 | 2.5 |
| Moisture permeability (g/m² · day) | 3.3 | 3.3 | 4 | 8 | 3.5 | 3 |
| Lamination strength (N/15 mm) | 1.4 | 1.2 | 1.2 | 0.1 | 0.3 | 0.3 |

Figure 1:
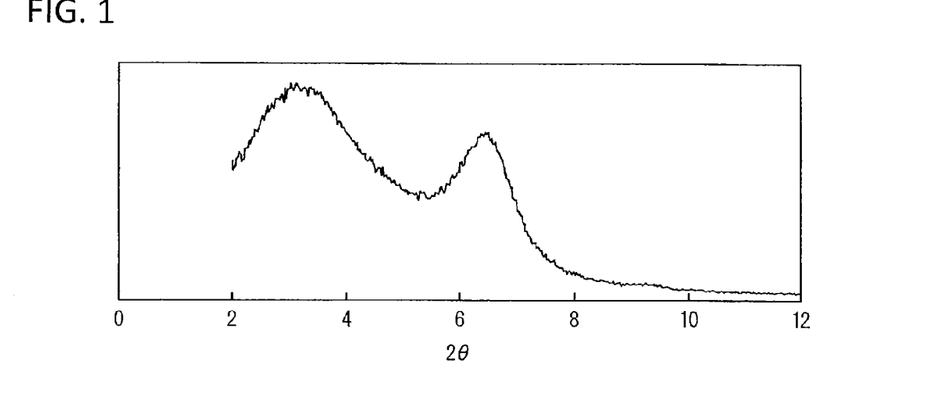
FIG. 1 is an X-ray diffraction spectrum measured using CuKα rays in an atmosphere of 25° C. and 65% RH for a gas barrier film of Example 1.
Figure 2:
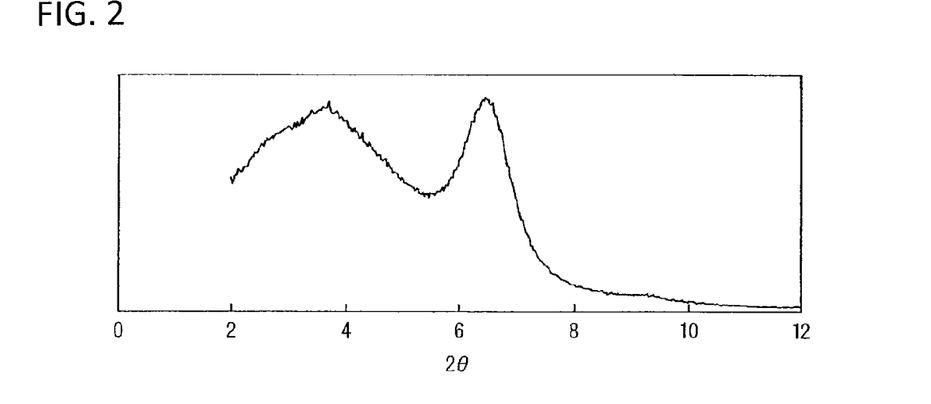
FIG. 2 is an X-ray diffraction spectrum measured using CuKα rays in an atmosphere of 25° C. and 65% RH for a gas barrier film of Example 2.
Figure 3:
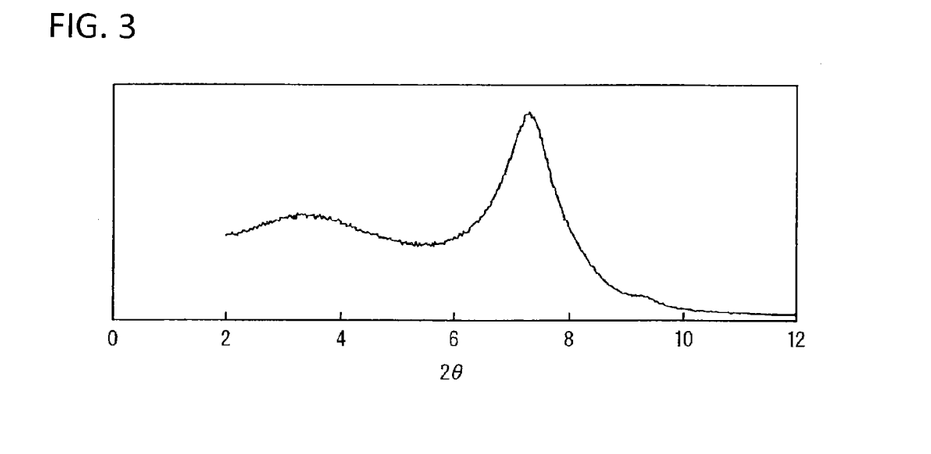
FIG. 3 is an X-ray diffraction spectrum measured using CuKα rays in an atmosphere of 25° C. and 65% RH for a gas barrier film of Example 3.

From the results shown in FIGS. 1-3, it was confirmed that the X-ray diffraction spectra of the gas barrier films of Examples 1-3 showed: a peak top (first peak top) at a position of 2θ=6.5° to 7.5°, the peak top being derived from an interlayer distance (12 to 13.5 Å) in the film composed of the inorganic layered mineral alone, not containing resin components between the layers of the inorganic layered mineral; and a peak top (second peak top) at a position of 2θ=2° to 4°, the peak top being derived from the interlayer distance being increased to 20 to 30 Å due to the insertion of a water-soluble resin between the layers of the inorganic layered mineral.

The gas barrier films of Examples 1-3 were substantially transparent and had no problem in visibility of package contents. Further, these gas barrier films exhibited good gas barrier properties including an oxygen permeability of not more than 5 cc/m² per day and a moisture permeability of not more than 5 g/m² per day, while exhibiting good adhesion strength, i.e. lamination strength exceeded 1N/15 mm. Thus, characteristics suitable for gas barrier packaging materials were obtained.

Figure 4:
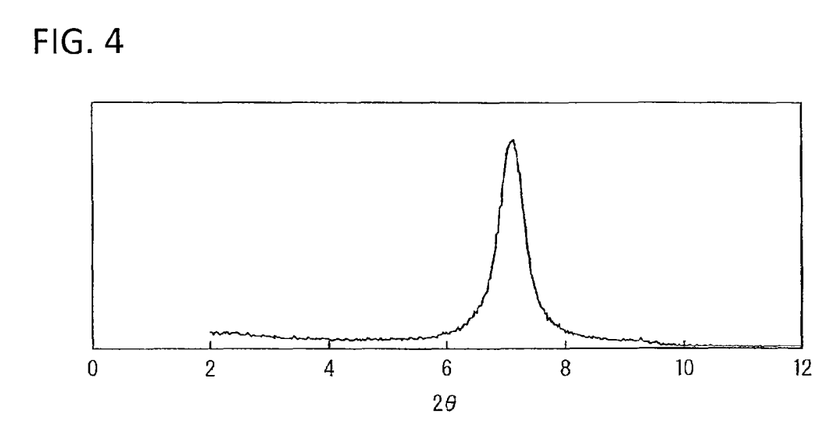
FIG. 4 is an X-ray diffraction spectrum measured using CuKα rays in an atmosphere of 25° C. and 65% RH for a gas barrier film of Comparative Example 1.
Figure 5:
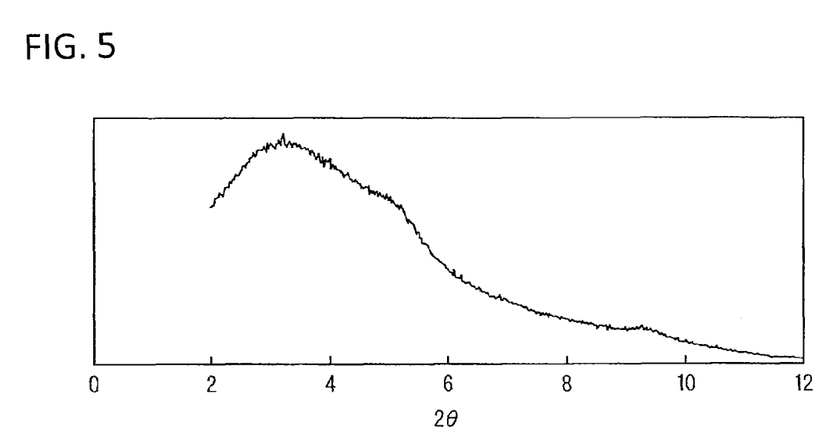
FIG. 5 is an X-ray diffraction spectrum measured using CuKα rays in an atmosphere of 25° C. and 65% RH for a gas barrier film of Comparative Example 2.
Figure 6:
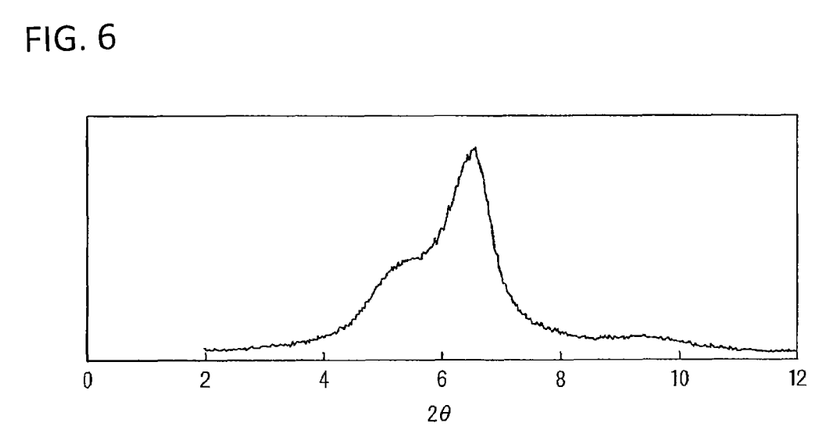
FIG. 6 is an X-ray diffraction spectrum measured using CuKα rays in an atmosphere of 25° C. and 65% RH for a gas barrier film of Comparative Example 3.

On the other hand, the X-ray diffraction spectra of Comparative Examples 1 and 3 showed only one peak top (first peak top) at a position of 2θ=6.5° to 7.5°, the peak top being derived from an interlayer distance in the coating film composed of the inorganic layered mineral alone, not containing resin components between the layers of the inorganic layered mineral. The X-ray diffraction spectrum of the gas barrier film of Comparative Example 2 showed only a peak top (second peak top) at a position of 2θ=2° to 4°, the peak top being derived from the interlayer distance being increased to 20 to 30 Å due to the insertion of the water-soluble resin between the layers of the inorganic layered minerals.

The gas barrier films of Comparative Examples 2 and 3 exhibited good gas barrier properties, however, exhibited a lamination strength of less than 0.5 N/15 mm and were thus insufficient in the adhesion strength. The gas barrier film of Comparative Example 1 was inferior in the gas barrier properties and the lamination strength.

Packaging materials are used for packaging food products or pharmaceutical products. Since gas barrier properties are desired, packaging materials may be provided with a gas barrier layer made of a material having gas barrier properties. The gas barrier layer may be formed on a base, such as a film or paper, by sputtering or vapor deposition, or wet coating or printing, or the like. The gas barrier layer may include a metal foil or metal deposition film such as of aluminum, or a resin film such as of polyvinyl alcohol, ethylene-vinyl alcohol copolymer, polyvinylidene chloride, MXD6 nylon or modified polyurethane.

A metal foil or metal deposition film tends to have excellent gas barrier properties, but there may be problems. For example, product recognition may be impossible due to its opaqueness, cracks may occur by several percent of elongation due to its low elasticity, thus leading to a lowering of the gas barrier properties, or it may need to be treated as an incombustible material when discarded after use.

The gas barrier layer made of a resin film of polyvinylidene chloride tends to exert good gas barrier properties free of humidity dependence, but may become a source of generating harmful substances, such as dioxin, in the course of disposal treatment. Thus, packaging materials that contain chlorine-based substances tend to be unpopular.

On the other hand, a gas barrier layer made of a resin film of non-chlorine polyvinyl alcohol or ethylene-vinyl alcohol copolymer shows high gas barrier properties in a low-humidity atmosphere. However, because of being humidity dependent, such a gas barrier layer may have disadvantage in that the gas barrier properties may significantly lower as humidity increases and the gas barrier properties may be lost at a humidity of not less than 70% RH.

Other types of gas barrier resin films are inferior, in the gas barrier properties, to those of a resin film of polyvinylidene chloride and a resin film of polyvinyl alcohol that is placed in a low-humidity atmosphere. In order to improve the gas barrier properties of these resin films, a resin film may be made of a composite product of an inorganic layered mineral and a resin. In such a resin film, the inorganic layered mineral is orderly distributed and arranged so as to improve gas barrier properties. However, the regular distribution and arrangement of the inorganic layered mineral may lead to a lowering in cohesive force of the resin film or adhesion of the resin film to a base. Therefore, it is quite difficult to balance good gas barrier properties with sufficient adhesion strength as a packaging material.

One embodiment of the present invention provides a gas barrier film having excellent gas barrier properties in a high-humidity atmosphere and having a sufficient adhesion strength and a cohesive strength as a packaging material, and to provide a gas barrier film having excellent gas barrier properties in a high-humidity atmosphere without causing delamination failure.

A gas barrier film related to an embodiment of the present invention includes: a base film comprised of a plastic material; and a gas barrier layer formed on either one or both surfaces of the base film and comprised of an inorganic layered mineral and at least one resin component interposed between layers of the inorganic layered mineral. In the case where X-ray diffraction spectra of the gas barrier layer are measured in an atmosphere of 25° C. and 65% RH using CuKα rays, the X-ray diffraction spectra show a first peak top and a second peak top corresponding to interlayer distances of the inorganic layered mineral. The first peak top is derived from an interlayer distance of the thin films made of the inorganic layered mineral alone. The second peak top is derived from an interlayer distance of the inorganic layered mineral being increased caused by the interposition of the resin component between the layers of the inorganic layered mineral. The second peak top is present at a position lower than a position of the first peak top in a 2θ axis.

In this embodiment of the present invention, the inorganic layered mineral preferably contains water-swellable synthetic mica.

In the embodiment of the invention, the resin component preferably contains a water-soluble resin and a water-insoluble resin.

In the embodiment of the invention, the water-soluble resin is preferably a polyvinyl alcohol resin.

In the embodiment of the present invention, the water-insoluble resin is preferably a polyurethane resin.

In the embodiment of the invention, it is preferred to further laminate, on the gas barrier layer, a protective layer, an adhesive layer and a heat sealing resin layer successively.

The gas barrier film according to one embodiment of the invention includes a base film made of a plastic material, and a gas barrier film formed on one or both surfaces of the base film and made of an inorganic layered mineral and at least one resin component interposed between layers of the inorganic layered mineral, wherein when X-ray diffraction spectra of the gas barrier film are measured using CuKα rays in an atmosphere of 25° C. and 65 RH, the X-ray diffraction spectra show a first peak top and a second peak top corresponding to the interlayer distances of the inorganic layered mineral. The first peak top is derived from an interlayer distance of the thin films made of the inorganic layered mineral alone. The second peak top is derived from the interlayer distance of the inorganic layered mineral being increased caused by the interposition of the resin component between the layers of the inorganic layered mineral. Because the second peak top is present at a position lower than a position of the first peak top in a 2θ axis, high gas barrier properties and a sufficient adhesion force as a laminate film for package are ensured in a high-humidity atmosphere.

INDUSTRIAL APPLICABILITY

The present invention can be applied to packaging fields of food products, such as dried food, sweets, breads or delicacies, which hate moisture and oxygen, and of pharmaceutical products, such as disposable pocket warmers, tablets, powders or poultices/adhesive skin patches.

Obviously, numerous modifications and variations of the present invention are possible in light of the above teachings. It is therefore to be understood that within the scope of the appended claims, the invention may be practiced otherwise than as specifically described herein.

The invention claimed is:

1. A gas barrier film, comprising:
a base film comprising a plastic material; and
at least one gas barrier layer formed on the base film, wherein the gas barrier layer comprises a water-soluble resin, a water-insoluble resin, and an inorganic layered mineral having a plurality of layers such that at least one of the water-soluble resin and the water-insoluble resin is interposed between the layers of the inorganic layered mineral, the water-soluble resin is a polyvinyl alcohol resin, the water-insoluble resin comprises a polyurethane resin having an acid group including at least one of a carboxyl group and a sulfonic group, the inorganic layered mineral has an average particle size of from 1 μm to 10 μm, and the gas barrier film shows an X-ray diffraction spectrum having a first peak top and a second peak top when measured at 25° C. and 65% RH using CuKα rays, the first peak top is derived from a first interlayer distance between adjacent layers of the inorganic layered mineral, the second peak top is derived from a second interlayer distance which is greater than the first interlayer distance by interposition of the resin component between the layers of the inorganic layered mineral, and the second peak top is present at a position lower than a position of the first peak top in a 2θ axis.

2. The gas barrier film according to claim 1, wherein the inorganic layered mineral comprises a water-swellable synthetic mica.

3. The gas barrier film according to claim 2, wherein the gas barrier layer includes the water-soluble resin in a solid amount of from 10 to 25 parts by mass with respect to 100 parts by mass of a total solid amount of the inorganic layered mineral, the water-soluble resin, and the water-insoluble resin.

4. The gas barrier film according to claim 1, wherein the water-insoluble resin further comprises a polyamine compound.

5. The gas barrier film according to claim 1, further comprising:
a protective layer formed on the gas barrier layer;
an adhesive layer formed on the protective layer; and
a heat sealing resin layer formed on the adhesive layer.

6. The gas barrier film according to claim 1, wherein the inorganic layered mineral is a water-swellable synthetic mica, and the water-insoluble resin further comprises a polyamine compound.

7. The gas barrier film according to claim 6, wherein the first peak top is positioned at 2θ of 6.5° to 7.5°.

8. The gas barrier film according to claim 7, wherein the second peak top is positioned at 2θ of 2° to 4°.

9. The gas barrier film according to claim 1, wherein the inorganic layered mineral is montmorillonite.

10. The gas barrier film according to claim 9, wherein the first peak top is positioned at 2θ of 6.5° to 7.5°.

11. The gas barrier film according to claim 10, wherein the second peak top is positioned at 2θ of 2° to 4°.

12. The gas barrier film according to claim 1, wherein the gas barrier layer includes the water-soluble resin in a solid amount of from 10 to 25 parts by mass with respect to 100 parts by mass of a total solid amount of the inorganic layered mineral, the water-soluble resin, and the water-insoluble resin.

13. The gas barrier film according to claim 1, wherein the water-soluble resin is interposed between the layers of the inorganic layered mineral.

14. The gas barrier film according to claim 3, wherein the water-insoluble resin further comprises a polyamine compound.

15. The gas barrier film according to claim 1, wherein the gas barrier layer includes the water-soluble resin in a solid amount of from 10 to 25 parts by mass and the water-insoluble resin in a solid amount of from 50 to 70 parts by mass, with respect to 100 parts by mass of a total solid amount of the inorganic layered mineral, the water-soluble resin, and the water-insoluble resin.

16. The gas barrier film according to claim 3, wherein the water-insoluble resin further comprises a polyamine compound, and the gas barrier layer includes the water-insoluble resin in a solid amount of from 50 to 70 parts by mass, with respect to 100 parts by mass of a total solid amount of the inorganic layered mineral, the water-soluble resin, and the water-insoluble resin.

17. The gas barrier film according to claim 5, wherein the gas barrier layer includes the water-soluble resin in a solid amount of from 10 to 25 parts by mass, with respect to 100 parts by mass of a total solid amount of the inorganic layered mineral, the water-soluble resin, and the water-insoluble resin.

18. The gas barrier film according to claim 3, wherein the gas barrier layer includes the inorganic layered mineral in a solid amount of from 20 to 25 parts by mass, and the water-insoluble resin in a solid amount of from 50 to 70 parts by mass, with respect to 100 parts by mass of a total solid amount of the inorganic layered mineral, the water-soluble resin, and the water-insoluble resin.

19. The gas barrier film according to claim 18, wherein the first peak top is positioned at 2θ of 6.5° to 7.5°, and the second peak top is positioned at 2θ of 2° to 4°.

* * * * *